US009373961B2

(12) United States Patent
Mohammediyan et al.

(10) Patent No.: US 9,373,961 B2
(45) Date of Patent: Jun. 21, 2016

(54) ADAPTIVE LOAD CIRCUIT

(75) Inventors: Shahriyar Mohammediyan, LaSalle (CA); Truong-Khoa Nguyen, Saint-Laurent (CA); Christopher Yong, Pierrefonds (CA); Michel Doss, Montreal (CA); Christian Poirier, Montreal (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 902 days.

(21) Appl. No.: 13/474,227

(22) Filed: May 17, 2012

(65) Prior Publication Data
US 2013/0134783 A1 May 30, 2013

Related U.S. Application Data

(60) Provisional application No. 61/491,688, filed on May 31, 2011.

(51) Int. Cl.
*H02J 4/00* (2006.01)
*H05B 37/03* (2006.01)
*H05B 33/08* (2006.01)

(52) U.S. Cl.
CPC .............. *H02J 4/00* (2013.01); *H05B 33/0815* (2013.01); *H05B 37/034* (2013.01); *Y02B 20/383* (2013.01); *Y02B 20/72* (2013.01); *Y10T 307/469* (2015.04)

(58) Field of Classification Search
CPC ..... H02J 4/00; H05B 33/0815; H05B 37/034; Y02B 20/383; Y02B 20/72
See application file for complete search history.

(56) References Cited

U.S. PATENT DOCUMENTS

| 5,659,305 | A | * | 8/1997 | Rains et al. ................... 340/931 |
|---|---|---|---|---|
| 6,717,660 | B1 | | 4/2004 | Bernardo |
| 7,795,820 | B2 | | 9/2010 | Housman |
| 2006/0176187 | A1 | | 8/2006 | Bohler et al. |
| 2008/0218097 | A1 | | 9/2008 | Housman |
| 2010/0013405 | A1 | | 1/2010 | Thompson et al. |

FOREIGN PATENT DOCUMENTS

| EP | 0520660 A1 | 12/1992 |
|---|---|---|
| EP | 1241924 A2 | 9/2002 |
| EP | 2131630 A2 | 12/2009 |
| EP | 2288236 A | 2/2011 |
| GB | 2176640 A | 12/1986 |
| GB | 2371689 A | 7/2002 |
| GB | 2429542 A | 2/2007 |
| WO | 2007023309 A1 | 3/2007 |

OTHER PUBLICATIONS

Search Report and Written Opinion for corresponding PCT Application No. PCT/US2012/039944, dated Aug. 20, 2012.

* cited by examiner

*Primary Examiner* — Jared Fureman
*Assistant Examiner* — Aqeel Bukhari
(74) *Attorney, Agent, or Firm* — GE Global Patent Operation; Peter T. DiMauro

(57) ABSTRACT

The present subject matter is directed to an adaptive load circuit for use with traffic light control systems so as to permit operation using low current consumption lamps where the traffic light control systems were originally manufactured for operation with higher current consuming lamps. The adaptive load circuit provides a mechanism whereby an existing traffic light control system is fooled into accepting use of a low current consuming lamp by creating a specifically timed signal during an interval that the traffic light control system normally checks to determined lamp load characteristics.

13 Claims, 2 Drawing Sheets

ADAPTIVE LOAD CIRCUIT

PRIORITY CLAIM

This application claims the benefit of previously filed U.S. Provisional Patent Application entitled ADAPTIVE LOAD CIRCUIT," assigned U.S. Ser. No. 61/491,688, filed May 31, 2011, and which is incorporated herein by reference for all purposes.

BACKGROUND OF THE INVENTION

A. Field of the Invention

The present subject matter relates to lighting. More particularly, the present subject matter relates to LED (light emitting diode) based traffic lamps and associated circuitry.

B. Description of Related Art

Currently, traffic light control systems are specifically designed to operate with incandescent or halogen lamps. Both of these lamp types are relatively high power consumption devices. More recently, the use of LED traffic lamps has found favor for many reasons; including longer life expectancies than previously used lamps, as well as their operation at significantly lower energy consumption rates.

An issue has arisen, however, in that some specific street traffic light controllers expect a load power consumption greatly exceeding that of an LED traffic lamp. In these cases, simply replacing the normally used incandescent or halogen lamp with an LED replacement device may cause the controller to malfunction or otherwise decide that the lamp is burned out and, thus, stop sending control signals to the lamp.

In view of these known issues, it would be advantageous, therefore, to provide a circuit for use with LED traffic lamps that will allow existing street traffic light controllers to continue normal operations using LED or other type low power consumption lamps.

BRIEF DESCRIPTION OF THE INVENTION

Aspects and advantages of the invention will be set forth in part in the following description, or may be obvious from the description, or may be learned through practice of the invention.

The present subject matter relates to an adaptive load circuit configured to enable use of low power consumption loads with an apparatus which is configured to periodically test for power consumption. The adaptive load circuit includes a timing signal input, a command transfer circuit coupled to the timing signal input that is configured to produce a signal in synchronism with a timing signal applied to the timing signal input, a switch configured to receive a signal from the command transfer circuit, and a load. In such circuit, upon receipt of a signal from the command transfer signal, the circuit causes the switch to connect the load such that periodic tests for power consumption by the apparatus will be successful. In certain embodiments, the circuit is configured as an options board for association with the apparatus. In selected embodiments, the circuit is configured for association with a low power consuming lighting device.

In particular embodiments, the circuit also includes a feedback controlled constant current source coupled to the load by way of the switch so that the load remains constant while the switch is conductive. In selected embodiments, the feedback controlled constant current source is configured to operate independently of current flow through the low power consumption loads.

The present subject matter also relates to a lighting device comprising a low power consuming lighting device and an adaptive load circuit coupled in parallel with the low power consuming device. In these embodiments, the adaptive load circuit is configured to periodically provide an increased power load so that total power consumption by the low power consuming lighting device and the adaptive load circuit will periodically exceed a predetermined value. In particular embodiments, the lighting device is a light emitting diode and in certain embodiments, the adaptive load circuit is configured as an option board for the lighting device. In certain other embodiments, the adaptive load circuit is configured to periodically provide an increased power load only while the lighting device is operational.

The present subject matter also relates to a method of permitting operation of a low power consuming device in an apparatus periodically expecting higher power consumption. According to such embodiments the method provides for monitoring the apparatus to determine times that the apparatus expects higher power consumption and supplying an increased load on the apparatus during expected higher power consumption periods. In certain embodiments the method also provides for coupling an electrical load device in parallel with the low power consuming device.

The present subject matter also relates to a method for enabling use of a low power consuming lighting device with a street traffic light control system that is configured to normally expect a higher power consuming device as a load. Such apparatus includes a controller that is configured to periodically require power consumption from an AC input line of a lighting device to be above a predetermined level. In this manner the apparatus may determine whether the lamp it is controlling is operative or not. According to such embodiments, the method of the present subject matter provides for associating an adaptive load circuit with one of the low power consuming lighting device and the street traffic control system, monitoring the AC input line to determine periods of required power consumption above the predetermined level, and activating the adaptive load circuit during the determined periods. Such embodiments, in certain cases provide for associating a controllably switched load with the low power consuming lighting device that, in certain instances includes associating a controllably switched load in parallel with a light emitting diode.

The present subject matter also relates to a method for enabling use of adaptive consumption loads with apparatus that periodically test for predetermined power consumption levels. According to such embodiments, the method provides for associating a low power consuming load device with the apparatus, receiving a timing signal from the apparatus, and supplying a square wave signal in synchronism with the timing signal to increase apparatus determined power consumption. In such embodiments, the method enables the apparatus conducted power consumption test determine power consumption to be above a predetermined level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
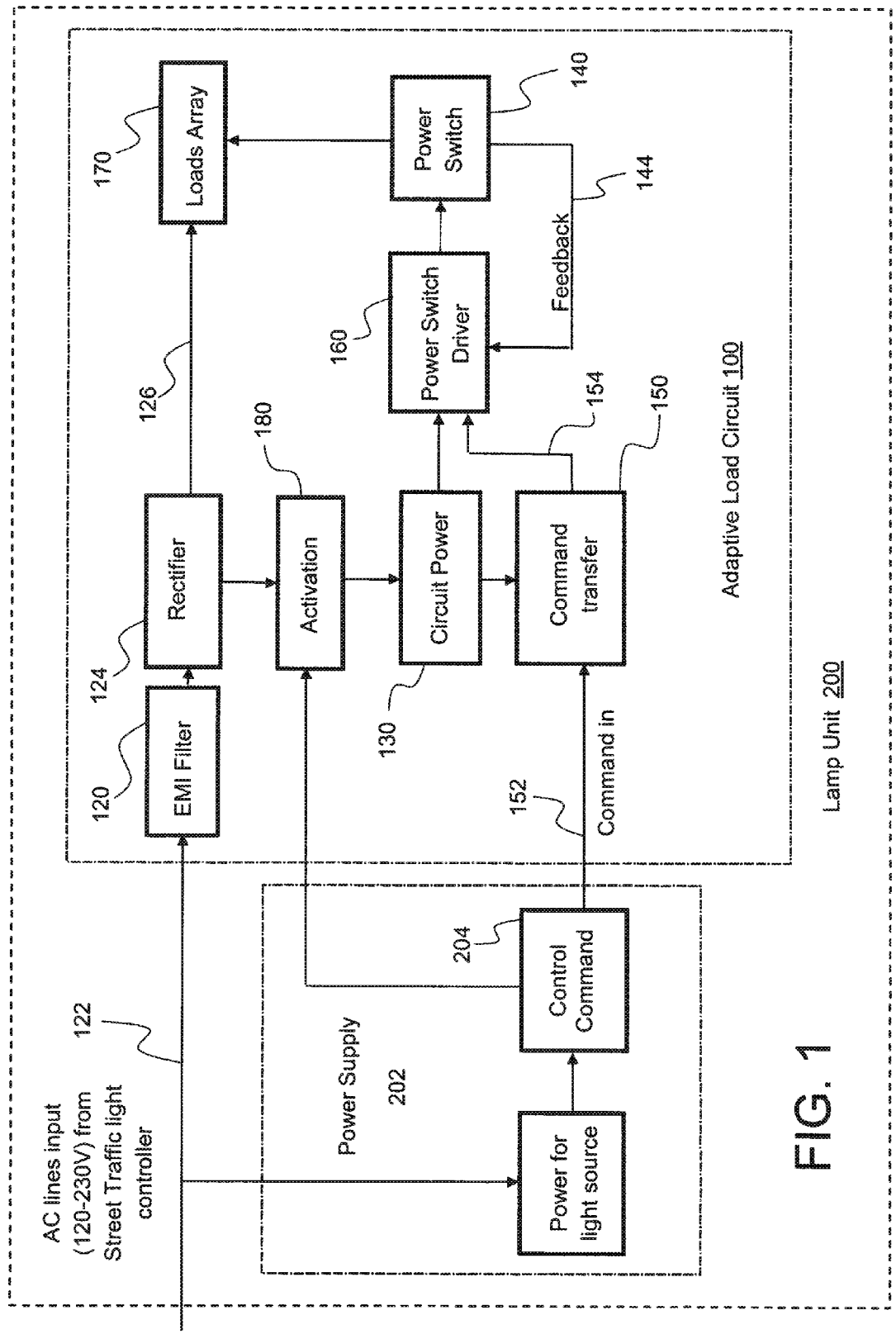
FIG. 1 is a block diagram of a lamp unit and adaptive load circuit in accordance with embodiments of the present disclosure.

Repeat use of reference characters throughout the present specification and appended drawings is intended to represent the same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a block diagram of a lamp unit 200 that is configured for use with a street traffic light control system (not separately illustrated) including a power supply 202 with internal control command 204 and, coupled thereto, an adaptive load circuit 100 in accordance with embodiments of the present disclosure that is configured to increases the power consumption recognized by the street traffic light control system. FIG. 1 also illustrates various elements of the sub-system architecture for the adaptive load circuit 100.

The sub-system architecture of the adaptive load circuit 100 includes an EMI filter 120 provided to reduce electronic noise emissions, a rectifier 124 to convert the AC line voltage that, in an exemplary embodiment, generally ranges from 120 to 230VAC, on line 122 passing through EMI filter 120 to a DC line voltage on line 126. The DC voltage on line 126 is applied to a loads array 170 that, in accordance with the present subject matter, is designed to provide increased power consumption that will be sensed by the street traffic light control system (not separately illustrated). The adaptive load sub system architecture also includes an activation circuit 180 to enable the creation of a power signal whereby a power circuit 130 is enabled to provide operating power for the adaptive load circuit components.

Further, the adaptive load sub-system architecture 100 also includes a command transfer circuit 150 that is configured to convert a signal command over line 152 from the control command circuit 204 to a compatible command for the circuitry of the adaptive load. Finally, the adaptive load sub system architecture also includes a power switch 140 configured to control electrical power flow to the loads array 170, and a power switch driver circuit 160 to provide a command signal for the power switch 140.

As shown in FIG. 1, the adaptive load circuit 100 is designed to generate synchronized signals on line 154, through an isolated command transfer circuit 150. Upon receiving a command from control command circuit 204 over line 152, the adaptive load circuit 100 creates a synchronized signal to increase the power consumption recognized, i.e., perceived by the street traffic lamp control system (not illustrated) during a specific time interval. The power consumption monitored by a street traffic lamp controller, which was originally manufactured to operate with incandescent or halogen lamp loads, will be interpreted as a correct load current consumption.

In one embodiment, an LED traffic lamp unit 200 operating with a power supply 202 coupled internally with the adaptive load circuit 100 can mimic a traditional traffic lamp by creating a power signal during a specific interval of the input AC line waveform. Generally, street traffic lamp controllers determine the lamp power consumption by reading the input current drop due to the traffic lamp during a predetermined time interval. By increasing the perceived LED lamp power consumption, that is, the input current consumption for a fixed voltage, during the specific interval when the street traffic controller reads the input current drawn by the LED lamp, one can essentially "fool" the street traffic light controller into recognizing the existence of a higher overall power consumption. Consequently, operation in accordance with this method permits the usage of LED traffic lamps or other types of low power consuming lamps with street traffic light controllers specifically designed for incandescent or halogen loads.

In some embodiments of the present subject matter, the adaptive load circuit 100 corresponds to, or forms a part of, an option board to be integrated in a traffic lamp unit. Regardless of the particular implementation, however, the adaptive load circuit 100 is, in fact, connected in parallel with the lamp unit. In some embodiments, the adaptive load circuit 100 can be provided either internal to the lamp or external thereof.

The adaptive load circuit 100 is not designed to have any control over the light source generated by the lamp unit, rather the power supply 202 determines the operating condition (ON/OFF) based on the AC input signal amplitude and frequency on line 122, which may be determined by measuring a scaled down full wave rectified input voltage signal. Once the power supply 202 is turned ON, the control command circuit 204 provides timing signals to the adaptive load circuit 100 via line 152. The adaptive load circuit 100 does not measure the input current of the power supply 202, but instead receives a command signal over line 152 from the control command circuit 204 only when it needs to be activated. In this way, the adaptive load circuit 100 is dependent on the functionality of the power supply 202 to operate. If the power supply 202 is to be disabled, then the adaptive load circuit 100 will automatically also be disabled. This method insures that the street traffic light control system will "see" no power consumption when the lamp unit is disabled by a failure of the power supply 202.

The power consumption method in accordance with the present subject matter provides an adjustable phase and width signal, synchronized to the AC line voltage waveform, to provide the correct power consumption readings. Once the adaptive load circuit 100 receives a synchronized signal from the control command circuit 204 via line 152, the command transfer circuit 150 will provide a signal via line 154, which is adjustable both in phase angle and width, independent of the input frequency AC line voltage waveform and controlled in firmware, from the control command circuit 204 internal to the power supply 202, to activate a power switch 140 connected to a loads array 170 to increase power consumption.

A feedback system 144, and power switch driver 160, independent of the power supply 202, monitor additional current drawn by the loads array 170 when the power switch 140 is activated. The current level is fixed and remains unchanged over the operating voltage range of the lamp unit 200. The current signal drawn by the adaptive load is square shaped since the amplitude (level) of the current drawn is controlled.

Since the adaptive load circuit 100 as described herein is independent of the input AC line frequency, adjustable phase angle and width and controlled in firmware, the circuit can be used as a universal adaptive load.

When the synchronized signal command option generated by the control command circuit 204 is enabled, the adaptive load circuit 100 activates the signal to produce the added load by the loads array 170 only at the start of the requested phase angle and for the requested width. The signal also only appears at every selected number of cycles as determined by the control command circuit 204 and not by the adaptive load circuit 100. In an exemplary configuration, this may correspond to one signal command on each half wave per every three cycles. These options may be setup by a user in the lamp unit itself by first defining the command start with respect to a start phase angle and an end width of the AC line waveform. The user may then specify in the control command circuit 204 that the command signal applied to line 152 is created every x number of cycles.

It should be appreciated by those of ordinary skill in the art that various exemplary circuits are usable for the block diagram of FIG. 1 and may be provided in many different forms. For example, the functionality of these various circuits may be provided in whole or in part by a processor, controller, microcontroller, computer, application specific integrated circuit (ASIC) device, any form of hardware circuitry or similar such devices or circuitry without limitation. Control for such devices may be provided in software or firmware in combination with appropriate hardware.

As previously mentioned, apparatus constructed in accordance with embodiments of the adaptive load circuit 100 may be provided as a printed circuit option board. Such boards may be coupled to existing street traffic light control systems or interconnected using, for example, edge connectors or other appropriate connections. In yet alternative embodiments, the adaptive load circuit 100 may be incorporated directly into a lamp unit constructed of one or more LED devices to form a composite device that may be directly substituted for a previously used incandescent or other type of higher power consuming light producing device.

Further still, an adaptive load circuit 100 constructed in accordance with embodiments of the present disclosure will allow low power consumption lamps, including LED lamps and other more efficient traffic lamps, to work with traditional traffic controllers that were originally manufactured to work with incandescent lamps. It should be apparent to those of ordinary skill in the art that embodiments of the present technology will help to save energy in a green environment and ultimately save money.

Figure 2:
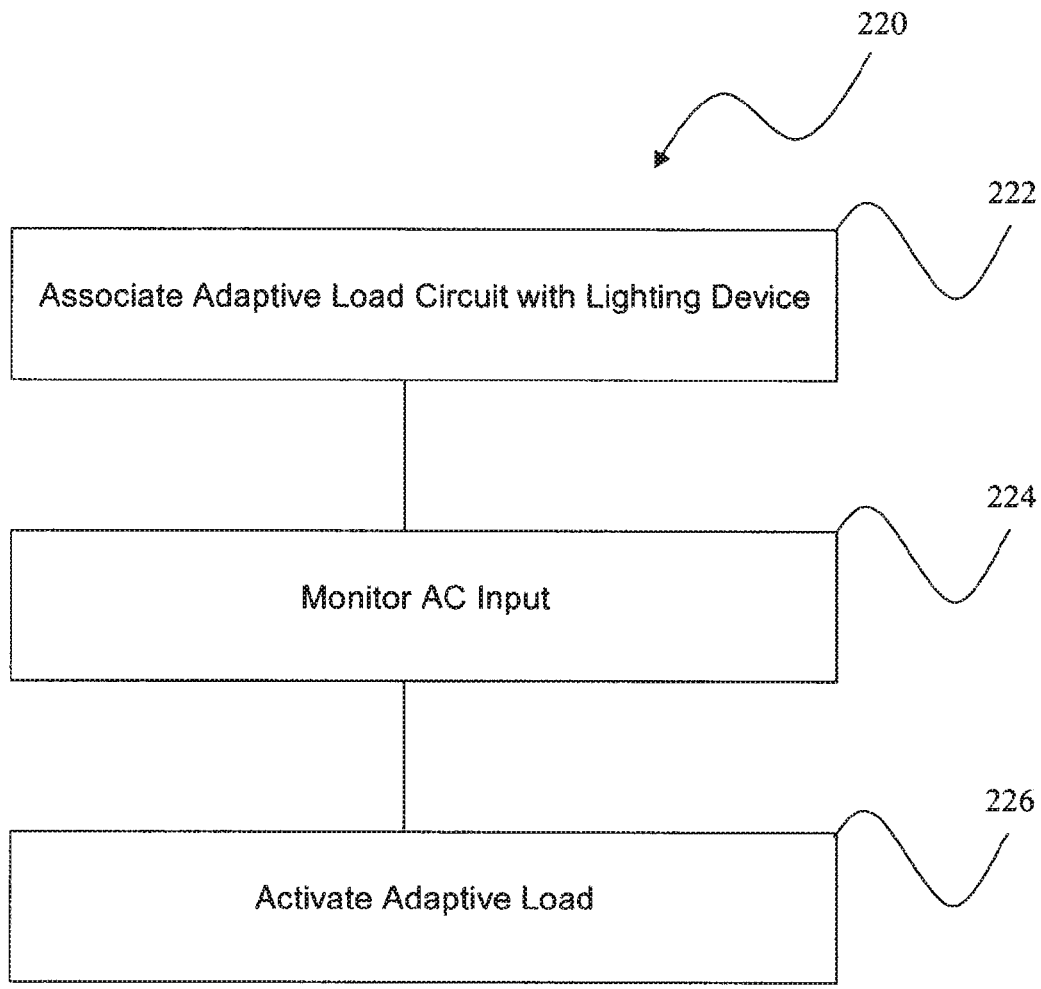
FIG. 2 is a flow chart of an exemplary method for practicing the present subject matter.

With reference to FIG. 2, there is illustrated a flow chart 220 of an exemplary method for practicing the present subject matter. As may be seen in FIG. 2, the method calls for associating an adaptive load circuit with a lighting device (step (222). Such association may include associating a controllably switched load with a low power consuming device. In some embodiments, such association may include associating a controllably switched load with a light emitting diode (LED).

In another step (step 224) the method calls for monitoring the AC input line to determined periods that the required power consumption be above a predetermined level. That is, the method will check the AC line to determined when any associated street traffic light control system is testing the lamp load it is controlling to determine the loads status.

In another step (step 226), the method calls for activating the adaptive load during the time period that any associated street light control system is expecting to see a load above a predetermined level. By operating the adaptive load of the present subject matter in this manner, the associated street traffic light control system is fooled into believing that the low power consuming lighting device now being used (possibly an LED) is actually consuming the higher power levels that the controller would have expected had the higher power consuming device been used.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An adaptive load circuit configured to enable use of low power consumption loads with an apparatus, the apparatus comprising a traffic light controller configured to periodically test for power consumption of the apparatus based on an input timing signal, the adaptive load circuit comprising:
   a command transfer circuit configured to produce a signal synchronized with the input timing signal;
   a switch coupled to the command transfer circuit and configured to receive the signal from said command transfer circuit, the signal configured to periodically activate the switch;
   a circuit power coupled to the switch; and
   a load coupled to the switch, the switch configured to couple the circuit power to the load when the switch is periodically activated,
   wherein activation of the switch by the signal causes said switch to connect said load and increase a power consumption detected by the traffic light controller.

2. A circuit as in claim 1, wherein said circuit is configured as an options board for association with the apparatus configured to periodically test for power consumption.

3. A circuit as in claim 1, wherein the apparatus comprises a low power-consuming lighting device and said circuit is coupled to the low power-consuming lighting device.

4. A circuit as in claim 1, further comprising:
   a feedback controlled constant current source coupled to said load by way of said switch,
   whereby current to said load remains constant while said switch is activated.

5. A circuit as in claim 4, wherein said feedback controlled constant current source is configured to operate independently of current flow through said low power consumption loads.

6. A lighting device, comprising:
   a low power-consuming lighting device;
   a controller configured to read a power consumption of the lighting device during a pre-determined time interval; and
   an adaptive load circuit, the adaptive load circuit comprising a switch coupling a circuit power to a load in an activated state of the switch, the adaptive load circuit being coupled in parallel with the low power-consuming lighting device when the switch is coupling the circuit power to the load;
   wherein said adaptive load circuit is configured to provide an increased power load to the lighting device during the pre-determined time interval in the activated state of the switch, whereby the power consumption of said lighting device read by the controller during the pre-determined time interval in the activated state of the switch is increased.

7. The device of claim 6, wherein said low power-consuming lighting device is a light emitting diode.

8. The device of claim 6, wherein the adaptive load circuit is configured as an option board for said lighting device.

9. The device of claim 6, wherein said adaptive load circuit is configured to periodically provide an increased power load only while said lighting device is operational.

10. A method for enabling use of a low power-consuming lighting device with a street traffic light control system configured to periodically require power consumption from an AC input line of a lighting device above a predetermined level, comprising:
  associating an adaptive load circuit with one of the low power consuming lighting device and the street traffic control system;
  monitoring the AC input line to determine periods of required power consumption above the predetermined level; and
  activating the adaptive load circuit during the determined periods of required power consumption above the pre-determined level to increase an actual power consumption of the lighting device above the predetermined level.

11. A method as in claim 10, wherein associating the adaptive load circuit comprises associating a controllably switched load with the low power-consuming lighting device.

12. A method as in claim 10, wherein associating the adaptive load circuit comprises associating a controllably switched load in parallel with a light emitting diode.

13. A method for enabling use of adaptive consumption loads with an apparatus powered by an AC power source, the apparatus being periodically tested for power consumption, the method comprising:
  associating a low power consuming load device with the apparatus;
  receiving a timing signal from the apparatus;
  converting the timing signal into a square wave signal that is synchronized with the timing signal and is independent of an input frequency of an AC power source to the apparatus; and
  supplying the square wave signal synchronized with the timing signal to periodically activate a switch, the switch configured to couple a power source to a load to increase a power consumption level of the apparatus during the periodic activation of the switch.

* * * * *